Dec. 6, 1966  F. W. RECKNAGEL  3,290,101
ANTIFRICTION BEARING ASSEMBLY
Filed April 2, 1964

INVENTOR.
FREDERICK W. RECKNAGEL
BY
ATTORNEY

3,290,101
ANTIFRICTION BEARING ASSEMBLY
Frederick W. Recknagel, Verbank, N.Y., assignor to The Federal Bearings Co., Inc., Poughkeepsie, N.Y., a corporation of New York
Filed Apr. 2, 1964, Ser. No. 356,902
4 Claims. (Cl. 308—187)

This invention relates to an antifriction bearing assembly and, in particular, to a bearing assembly containing more than one complement of rolling elements, the bearing being adapted to confine and retain lubricant in the region of each complement of rolling elements when operating with the axis of rotation transverse, for example vertical, to a normal horizontal position.

Bearings adapted for operation in a vertical position, that is with the axis of the rotating shaft disposed vertically, generally present the problem of lubricant starvation, particularly where more than one complement of rolling elements are employed in the bearing assembly. Generally, the uppermost complement of rolling elements loses its lubricant which usually seeps by gravity to the lower complement of rolling elements. Thus, as the upper raceways become starved of lubricant, they tend to break down.

It is an object of my invention to provide an antifriction bearing assembly having more than one complement of rolling element and having means cooperably associated therewith adapted to assure an adequate supply of lubricant for each complement of rolling elements when the bearing is used with the axis of the rotating shaft transverse, for example vertical, to a normal horizontal position.

Another object is to provide a bearing assembly for use in a vertical position having wick means for adding oil to a bearing for rejuvenating the grease therein.

These and other objects will more clearly appear when taken in conjunction with the following disclosure and the accompanying drawing, wherein.

In its preferred embodiment, the antifriction bearing assembly comprises an outer annular or hollow cylindrical bearing member having a pair of spaced annular raceways on the inner wall thereof. An inner cylindrical bearing member, such as a shaft, passes through the hollow member and also has a pair of spaced annular raceways around the surface thereof which raceways are aligned with the raceways on the inner wall. A complement of rolling elements extend into each of the aligned raceways and interlock the shaft and cylindrical member together. In a preferred embodiment, a long end of the shaft may extend out of one end of the bearing and may have drilled axially therein a cylindrical bore or chamber which has a felt wick in it for storing lubricant for feeding oil to the upper complement of roller bearings for rejuvenating the grease therein, the bore communicating with the annular space containing the rolling elements via an orifice. The bottom end of the bearing opposite the long extension of the shaft has a resilient bearing seal in wiping engagement with the shaft, while the end of the bearing through which the long extension of the shaft passes may have a metal shield which is adapted to serve as a guard while being designed to minimize seal drag. In order to inhibit lubricant in the upper rolling elements from seeping by gravity to the lower elements, a lubricant barrier is provided within the annular space of the bearing intermediate the complement of rolling elements, the barrier comprising preferably an annular resilient washer coaxially or concentrically fixed to the surface of one of the bearing members, such as the shaft or the inner wall of the hollow member and extending radially to the cylindrical surface of the other member. The extending washer may either contact or terminate just short of said cylindrical surface.

Figure 1:
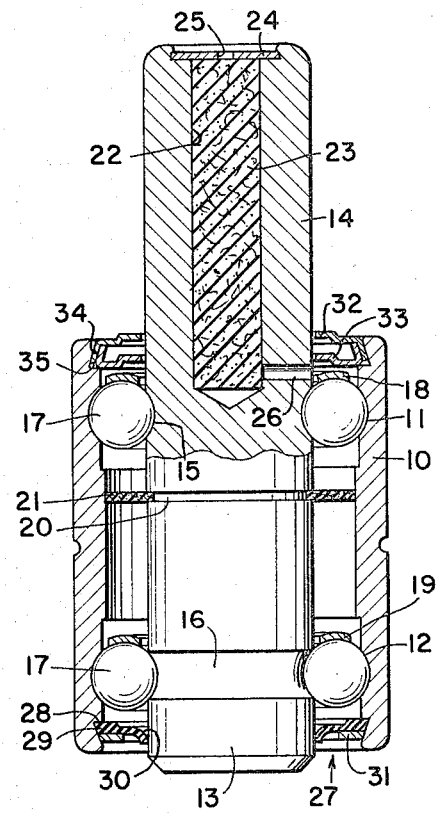
FIG. 1 depicts in elevation one embodiment of a bearing assembly, partially in cross section, showing a shaft passing through a hollow outer bearing member with the long extension of the shaft in the upper position and having a lubricant barrier associated therewith.

Referring to FIG. 1, one embodiment of the bearing assembly is shown partially in cross section disposed vertically with the long end of the shaft in the uppermost position. The bearing assembly comprises a hollow cylindrical or outer annular bearing member 10 of steel having a pair of annular raceways 11 and 12 spaced apart on the inner wall thereof as shown. The outer member has passing through it a shaft 13, which may be hollow or solid, also of steel having a long extension 14 protruding through the upper end of the bearing as shown. As with the outer annular bearing member, the shaft also has a pair of spaced raceways 15 and 16, which raceways are aligned with raceways 11 and 12, respectively. Rolling elements, such as a complement of bearing balls 17, extend into each of the aligned raceways and interlock the shaft and outer annular member together. The rolling elements are held in position by cages 18 and 19. While the rolling elements are shown as balls, they may, if desired, be cylindrical in shape.

Intermediate the complement of rolling elements, the shaft has an annular groove 20 in which is concentrically fixed a lubricant barrier comprising a resilient annular washer 21 of preferably a stiff fabric material coated with Buna-N rubber, the barrier extending radially outwardly to the inner cylindrical surface or wall of the outer bearing member. The barrier may comprise any suitable material, such as a phenolic impregnated cotton duck, fabric coated with a fluorocarbon, e.g. polytetrafluoroethylene, or coated with fluorosilicone rubber, or with chlorosulfonated polyethylene, or plain plastic material such as nylon, or any other resilient plastic or rubber material having resistance to abrasion, heat, flex cracking, oils, lubricants, etc.

In the long end of the shaft, a cylindrical bore or chamber is preferably, though not necessarily, axially drilled into it for confining therein a wick material 23 of, for example, felt, the wick being held in the chamber by means of metal washer 24 having a hole 25 concentrically located therein for adding lubricant to the chamber. The washer is slightly dished before it is inserted on top of the wick and is flattened to a certain extent to fix it in position. At the bottom of the chamber, an orifice 26 is provided communicating with the annular space containing the upper complement of bearing balls. The wick is used to store oil which is allowed by capillary action to seep into the bearing to rejuvenate the grease therein.

At the bottom end of the bearing, a seal 27 is provided press fitted into an annular groove having an annular shoulder 28, the seal comprising an annular washer of resilient material, e.g. Buna-N rubber, nylon, or other known seal materials, having a thickened peripheral portion 29 forced against annular shoulder 28 and a thinner portion 30 extending freely and radially inward towards and in wiping engagement with shaft 13. A metal retainer or washer 31 is provided for holding the seal in position against dislodgement. The seal may be bonded to a slightly dished washer which is then flattened out when assembled in the annular groove at the end of the bearing. This seal helps to retain the lubricant at the lower complement of roller elements from seeping out by gravity while closing the space against the intrusion of dirt, moisture, corrosive fluid and the like. On the other hand, lubricant barrier 21 located within the bearing itself inhibits lubricant from seeping away from the upper complement of rolling elements. Thus, both complements of rolling elements are enabled to maintain an adequate supply of lubricant substantially independent of the others.

At the upper end of the bearing, metal shields are preferably employed, though not necessarily, in place of resilient seals in order to keep seal drag on the shaft at a minimum. In the preferred embodiment, two metal shields, which may be made of SAE 1008 or 1010 steel, comprise inner and outer annular members 32 and 33 press fitted in an annular end groove 34 having an inwardly projecting shoulder 35 against which the shields are pressed in place. The pair of annular shields each have a bent peripheral portion such that in the case of shield 32, the peripheral bend projects inwardly of the annular groove and rides the groove, while the peripheral bend of shield 33 is telescoped within the bend of shield 32. Each of the shields extends radially towards the shaft in very close proximity to it without touching the shaft, for example within 0.005 or 0.010 inch of the shaft. The two shields thus positioned define an annular chamber between them which surrounds the shaft. In place of the shields, a bearing seal may be used as employed at the bottom end of the bearing.

Figure 2:
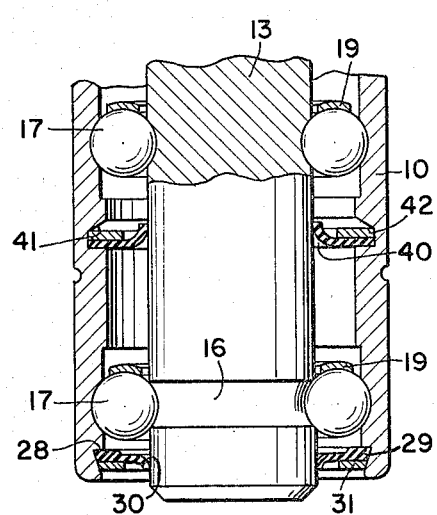
FIG. 2 is a fragmentary representation of a bearing showing another embodiment of a lubricant barrier.

FIG. 2 is a fragmentary representation of another embodiment of the lubricant barrier, the barrier in this instance being shown as fixed to an annular groove in the inner wall of the outer bearing member and extending radially towards the shaft and in flexing engagement with it. Thus, in FIG. 2, the bearing parts are shown having the same numeral designations except for the lubricant barrier. There the lubricant barrier comprises an annular resilient seal material 40 of nylon, plastic impregnated fabric or rubber coated fabric coaxially anchored in annular groove 41 by means of a metal washer 42, such as a split metal washer, the barrier extending to and flexingly engaging the shaft as shown.

In mounting the bearing balls in place, a one piece snap-in cage is preferably employed which is sprung in place on the same side of the balls as shown in FIGS. 1 and 2.

While the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. An antifriction bearing assembly for use with its axis of rotation transverse to a normal horizontal position, a shaft passing through an outer annular bearing member and having a portion extending and terminating beyond one end of said annular bearing member, a pair of spaced annular raceways on said shaft, a pair of spaced annular raceways on the inner wall of said annular bearing member aligned with the raceways of said shaft, a complement of rolling elements extending into each of the aligned raceways and interlocking the shaft and annular bearing member together, a cylindrical bore axially located in the extending portion of said shaft and having a wick therein for holding a lubricant, a closure element at the terminal end portion of said extending shaft fitted in an annular groove at the opening of said bore for confining the wick in said bore, said closure element having an opening therein through which lubricant can be added to the confined wick, the bore having at its opposite end a lubricant-passing orifice communicating with an annular space containing one of the complements of rolling elements, an annular groove on the surface of said shaft intermediate the raceways, a lubricant barrier comprising a resilient annular washer coaxially fixed in said annular groove and extending radially to the wall of said cylindrical member, said barrier inhibiting the lubricant associated with one complement of rolling elements from gravimetrically flowing to the other, and means associated with each end of the annular bearing member for substantially closing the space occupied by the rolling elements against the intrusion from the environment of dirt, moisture, corrosive fluids and the like.

2. An antifriction bearing assembly for use with its axis of rotation transverse to a normal horizontal position, a shaft passing through an outer annular bearing member and having a portion extending and terminating beyond one end of said annular bearing member, a pair of spaced annular raceways on said shaft, a pair of spaced annular raceways on the inner wall of said annular bearing member aligned with the raceways of said shaft, a complement of rolling elements extending into each of the aligned raceways and interlocking the shaft and annular bearing member together, a cylindrical bore axially located in the extending portion of said shaft and having a wick therein for holding a lubricant, a closure element at the terminal end portion of said extending shaft fitted in an annular groove at the opening of said bore for confining the wick in said bore, said closure element having an opening therein through which lubricant can be added to the confined wick, the bore having at its opposite end a lubricant-passing orifice communicating with an annular space containing one of the complements of rolling elements, an annular groove on the inner surface of said annular bearing member intermediate the raceways, a lubricant barrier comprising a resilient annular washer coaxially fixed in said annular groove and extending radially to and flexingly engaging said shaft, said barrier inhibiting the lubricant associated with one complement of rolling elements from gravimetrically flowing to the other, and means associated with each end of the annular bearing member for substantially closing the space occupied by the rolling elements against the intrusion from the environment of dirt, moisture, corrosive fluids and the like.

3. An antifriction bearing assembly for use with its axis of rotation transverse to a normal horizontal position, an inner cylindrical bearing member passing through an outer annular bearing member and having a portion extending beyond one end of said annular bearing member, a pair of spaced annular raceways on said inner bearing member, a pair of spaced annular raceways on the inner wall of said annular bearing member aligned with the raceways of said shaft, a complement of rolling elements extending into each of the aligned raceways and interlocking the inner bearing member and annular bearing member together, a cylindrical bore axially located in the extending portion of said inner bearing member and having a wick therein for holding a lubricant, a closure element at the terminal end portion of said extending portion fitted in an annular groove at the opening of said bore for confining the wick in said bore, said closure element having an opening therein through which lubricant can be added to the confined wick, the bore having at its opposite end a lubricant-passing orifice communicating with an annular space containing one of the complements of rolling elements, and a lubricant barrier comprising a resilient annular washer intermediate said complements of rolling elements concentrically fixed to the surface of one of the annular bearing members and extending radially to the surface of said other annular bearing member, said barrier inhibiting the lubricant from flowing from one complement of rolling elements to the other.

4. An antifriction bearing assembly for use with its axis of rotation transverse to a normal horizontal position, an inner cylindrical bearing member passing through an outer annular bearing member, a pair of spaced annular raceways on said inner bearing member, a pair of spaced annular raceways on the inner wall of said annular bearing member aligned with the raceways of said inner member, a complement of rolling elements extending into each of the aligned raceways and interlocking the inner and outer bearing members together, and a lubricant barrier supported intermediate said complements of rolling elements comprising a resilient annular washer concentrically fixed to the surface of one of the bearing members and extending radially to the surface of said other bearing member, said barrier inhibiting the lubricant from flowing from one complement of rolling elements to the other, and means associated with each end of the annular bearing member for substantially closing the space occupied by the rolling elements against the intrusion from the environment of dirt, moisture, corrosive fluids, and the like, one end of the annular bearing member being closed by an annular metal shield means which extends radially from the annular member to the inner cylindrical bearing member, the other end being closed by an annular resilient seal means which extends radially from the annular member into wiping engagement with the inner cylindrical bearing member.

References Cited by the Examiner

UNITED STATES PATENTS

| | | | |
|---|---|---|---|
| 1,722,489 | 7/1929 | Bott | 308—187.1 |
| 2,507,204 | 5/1950 | Giern et al. | 308—187.2 |
| 2,719,765 | 10/1955 | Menne | 308—93 |
| 2,724,623 | 11/1955 | Robinson et al. | 308—187.1 |
| 2,736,617 | 2/1956 | Lippmann | 308—187.1 |

FOREIGN PATENTS 582,067   12/1924   France.

MARTIN P. SCHWADRON, *Primary Examiner.*

FRANK SUSKO, DAVID J. WILLIAMOWSKY,
*Examiners.*